Feb. 20, 1968  P. W. JOHNSON  3,369,302
INTERNAL DIMENSIONAL GAGE WITH AXIALLY LIMITED OPERATING MEANS
Filed Aug. 5, 1966  2 Sheets-Sheet 1
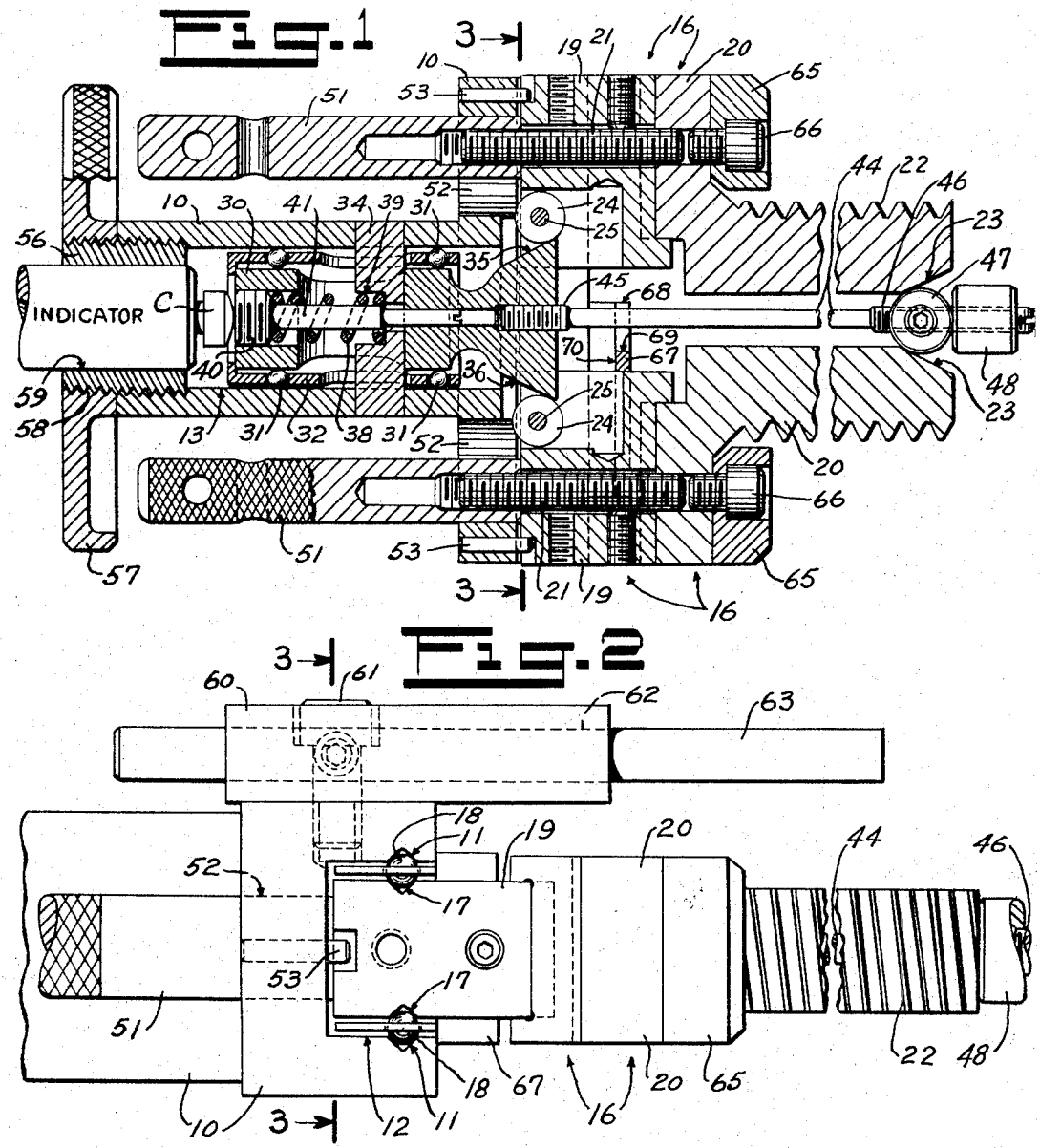
INVENTOR.
PAUL W. JOHNSON
BY
John M. Montstream
ATTORNEY Feb. 20, 1968   P. W. JOHNSON   3,369,302
INTERNAL DIMENSIONAL GAGE WITH AXIALLY LIMITED OPERATING MEANS
Filed Aug. 5, 1966   2 Sheets-Sheet 2
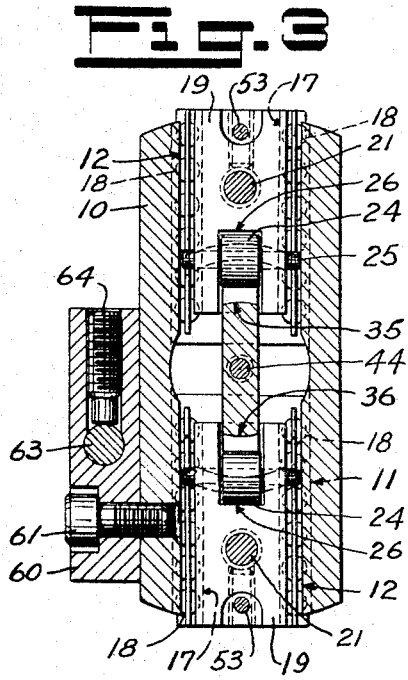
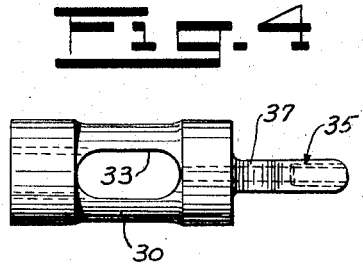
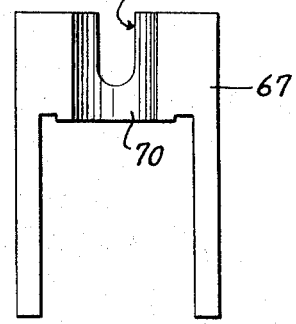
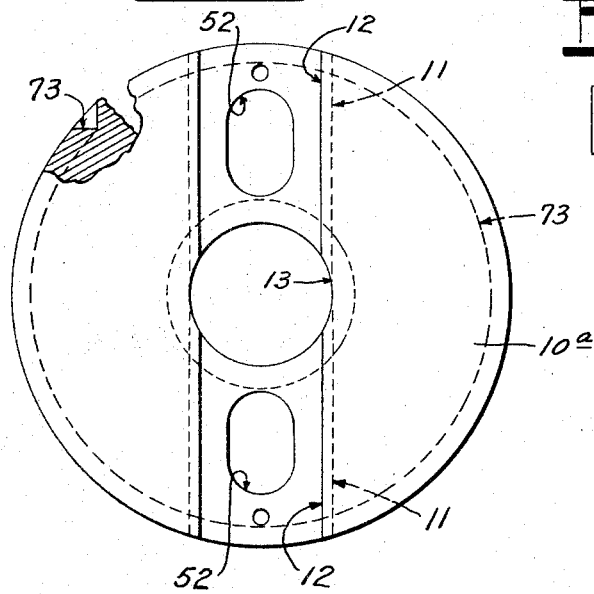
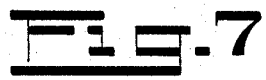
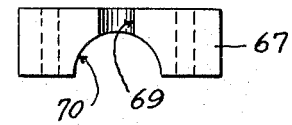
INVENTOR.
PAUL W. JOHNSON
BY
John M. Montstream
ATTORNEY

United States Patent Office

3,369,302
Patented Feb. 20, 1968

3,369,302
INTERNAL DIMENSIONAL GAGE WITH AXIALLY LIMITED OPERATNG MEANS
Paul W. Johnson, Bloomfield, Conn., assignor to The Johnson Gage Company, Bloomfield, Conn., a corporation of Connecticut
Filed Aug. 5, 1966, Ser. No. 570,471
7 Claims. (Cl. 33—147)

The invention is directed to a dimensional gage having expandible gaging means mounted for radial movement on a frame. The gage is used for measuring the internal dimension of an internal surface, and particularly an internal thread, of relatively small dimension. When the internal surface or thread is some distance within a hole in the test part so that the gaging elements must be relatively long to reach the surface to be gaged, there is enough flexibility in the gaging elements so that they flex outwardly significantly under the pressure of the spring means expanding the gaging elements. As a result, the reading of diameter on the indicator is greater than the actual dimension. The gage to be described provides a means to limit axial movement of the operating means which expands the gaging means controlled from the outer ends of the gaging elements so that the elements will not flex and an accurate reading is secured. This axial limiting means also gives support for the outer ends of the gaging elements.

It is an object of the invention to construct an internal dimensional gage having expandible gaging elements used for relatively small internal dimensions and having relatively long gaging elements which will flex because of slenderness and providing a movable support at the outer end of the gaging elements to prevent their flexing.

Other objects of the invention will be more apparent from the following description when taken in connection with the accompanying drawings illustrating a preferred embodiment thereof in which:

FIG. 1 is a longitudinal section through the gage.
FIG. 2 is an enlarged top view of part of the gage.
FIG. 3 is a scetion taken on line 3—3 of FIG. 1.
FIG. 4 is a view of the operating means for the gaging means.
FIG. 5 is an end view of a gage frame of circular form.
FIG. 6 is a front view of an abutting means; and,
FIG. 7 is a top view of the abutting means.

The gage includes a frame 10 having a plurality of radial guides shown as formed by a pair of opposed V-grooves 11. The grooves are in the sides of a radially extending slot 12 in the frame so that the V-grooves 11, as shown, face towards each other. In the gage particularly illustrated, there are two guides one on each side of the central axis of the frame. The frame also carries an axial bearing 13 which is shown as an internal bearing or a bore in the frame.

A gaging means 16 is slidable radially in each of the radial guides so that it carries V-grooves 17 on each side edge thereof. Within the cooperating V-grooves 11 and 17, there is received over-sized balls 18 such that the gaging means are freely movable, but have no shake. Preferably, the gaging means includes a slider 19 and a gaging element 20 secured to the slider by suitable screws 21. Each gaging element has a gaging surface 22, shown particularly with a threaded periphery 22, which may extend the full length of the element or may be just at the outer end. Each gaging element has an outer end at which there is an angular surface which is preferably flat.

Each gaging means may carry a roll 24 mounted on a pin 25 and carried in a slot 26 in its respective slider.

Operating means is provided to propel the gaging means radially outwardly. This operating means includes a cylindrical operating member 30, FIGS. 1 and 4, mounted in the bearing 13 for axial movement and in order to assure free movement, it is mounted in the bearing on ball bearings 31 which are over-sized so that there will be no shake of the operating member in the bearing of the frame. A ball retainer 32 may be used for easy insertion of the balls in the bearing and to retain the balls in place. The operating member has a slot 33 therein which receives a pin 34 carried by the frame which assures that the operating member does not turn in the bearing. A convenient way to secure the pin to the frame is to provide a drive fit for the pin into the frame. The operating member carries angular or conical means engaging the gaging means to propel the latter outwardly. Since the angular surface is carried by a narrow portion 37 of the operating member, an angular surface 35 is provided on one side thereof and a comparable angular surface 36 on the opposite side. The two angles are of equal size and with the angle directed radially outwardly towards the gaging means. Each angular surface engages one of the rolls 24.

The operating means includes spring means suitably located to propel the gaging means radially outwardly. The spring means particularly shown propels the operating member to the left as shown in FIG. 1. With the angular surfaces 35 and 36 engaging its respective roll, the gaging elements are propelled radially outwardly. The spring means shown is a circular spring 38 one end of which abuts the pin 34 and preferably sits in a hole 39 provided therein. The other end of the spring engages a screw 40 carried by the operating member and by turning the screw, adjustment of the compression of the spring 38 is secured. The screw may carry a spring rod 41.

When the gaging elements 20 are relatively long, so that they can reach into the bottom of a relatively deep hole, and relatively slender because of a small diameter, the gaging elements will flex under the pressure of the spring means 38 so that the slides are projected radially outwardly farther than expected with the result that the reading of the indicator for the internal dimension being gaged would be greater than the actual internal diameter of the test surface or screw thread. Axial limiting means is provided at the outer ends of the gaging elements such that when the gaging means is contracted, in order to insert the gaging elements into a hole, the axial limiting means moves axially and equally with the operating member 30. The axial limiting means is shown secured or carried by the operating member by a connection 44 which projects from the end of the operating member and conveniently is a separate member threaded thereto by a thread 45. The other end of the connection also may carry a thread 46 on which is received an axial limiting member 47, preferably cylindrical. The axial limiting member has a diameter to engage the angular surfaces 23 on the ends of the gaging elements. A lock nut 48 may be threaded on to the end of the connection. Any other suitable adjustable mounting for the axial limiting member 47 on the connection may be used. One of the threads 45 and 46 may be a right hand thread and the other a left hand thread which would enable quicker adjustment to be made of the proper position for the axial limiting member 47 in engagement with the angular surfaces 23.

The angular surfaces 35, 36 and 23 are equal angularly and extend in the same direction so that as the operating member moves to the right, the axial limiting member 47 moves therewith an equal amount and hence will always contact the surfaces 23 as the gaging elements move radially outwardly or inwardly. As a result, the operating member is limited in its axial movement to correspond with the axial movement of the axial limiting member so that the axial movement of the operating member cannot exceed the axial movement of the axial limiting member as it otherwise would by flexing of the gaging elements. The gaging elements remain parallel at all times which is essential whether or not the gaging surfaces 22 are solely at the outer end or extend the full length of the element. To express it differently, the axial limiting member prevents flexing of the gaging elements. Preferably the angle is not more than three minutes on either side of an angle of 26 degrees 34 minutes the ideal angle being that having a tangent of one half, because then a standard dial on the indicator may be used. As long as the angles 23 are correct, it is not necessary that the angles be precisely located axially with respect to each other and it has been found that the two gaging elements may flex in one direction together without affecting the accuracy of the reading.

Manual means is provided to contract the gaging elements, the means shown being a handle 51 carried by each gaging means such as on the screw 21. Pressing of the handles radially inwardly shifts the operating member to the right by the action of the rolls 24 on the angular surfaces of the operating member and contracts the gaging means so that they may be inserted into a hole to be gaged. Upon release of the handles, the spring means 38 propels the operating member 30 to the left and expands the gaging means through the engagement of the angular surfaces 35 and 36 with their respective roll 24. The handles expand through a slot 52 in the frame. The ends of these slots 52 may serve as a stop against excessive expansion of the gaging means, however, other stops may be provided in the pins 53 carried by the frame and engaging its respective gaging means.

Suitable indicator means will be provided to indicate the position of the gaging elements and a convenient location is to provide indicator mounting means shown particularly as a contractile bushing 56 threaded into the end of the frame 10 and which bushing carries a nut 57 threaded on the threads 58 carried by the contractile bushing to contract the bushing by the inclined flanks of the screw threads and grip the stem of the indicator. The bushing has a bearing or hole 59 for receiving the stem of an indicator having a contactor C which is positioned to engage the operating member 30 or particularly the screw 40 carried thereby.

It is desirable that the gage carry an adjustable depth means to properly locate the gaging elements at the proper depth in the hole. This means comprises a bracket 60 secured to the frame 10 such as by a screw 61 which bracket has a hole 62 extending therethrough to receive a depth pin 63. This depth pin is secured in adjusted position by a lock screw 64 engaging the pin. A simpler form which is not adjustable includes blocks 65 secured to the slides by a screw 66, the face of which blocks properly positions the gaging elements in the hole.

Abutting means 67 may be provided between the sliders to prevent engagement of the gaging elements when they are contracted for insertion in a test part. If the gaging elements engage in the closing movement, after a time they lose their adjustment irrespective of how tightly the screws 21 are tightened. The abutting means 67 shown is a U-shaped part with its legs straddling one of the sliders and its end surface 68 positioned to engage the other slider when the gaging means are contracted which engagement occurs when the gaging elements are spaced from each other. The abutting means has an opening 69 to pass the connecting member 44. It may also have a slot 70 to give sufficient space for axial movement of the operating member.

The frame may be cylindrical as shown in the frame 10a of FIG. 5 with a peripheral ball groove 73 so that the gage may carry a rotatable ring for an indicator or indicators for testing other surfaces for centricity or squareness or both with respect to the test surface or thread as shown in my application S.N. 299,682, filed July 29, 1963.

The axial limiting member 47 also provides support between the outer ends of the gaging elements such that if one element should flex inwardly it would be resisted by the other element through the member 47.

Significant flexing of the gaging elements will vary for different thread sizes. A gage for a quarter inch thread necessarily has very slender gaging elements and significant flexing of one or more ten thousandths of an inch will occur when the elements are as short in length as one inch. With gaging elements for larger diameters, significant flexing occurs when the gaging elements are longer. Such flexing will depend on gaging element diameter and length. For any one diameter, the longer the gaging elements a greater amount of flexing would occur without the axial limiting means 44, 47. Again, generally for larger diameters, the same degree of preciseness is not usually required and a flexing of one or two ten thousandths may be permissible. The construction of the gage finds its greater usefulness in the range from a number 10 screw thread to a five eighths diameter thread.

This invention is presented to fill a need for improvements in an internal dimensional gage of relatively small dimension. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. An internal dimensional gage adapted to carry an indicator having a contactor comprising a frame having a plurality of radial guides and an axis, gaging means slidably mounted in each radial guide and having a gaging surface and an outer end, an axially extending bearing carried by the frame; operating means to move the gaging means radially outwardly including an operating member mounted in the bearing for axial movement and having an angular surface for each gaging means, said angular surface engaging the gaging means, and spring means operatively connected with the gaging means to propel the latter radially outwardly; manual means connected with the gaging means to propel the same radially inwardly; an angular surface carried by the outer end of each gaging means having an angularity with respect to the axis the same as and in the same direction as the angular surface on the operating means, axial limiting means carried by the operating member and movable therewith and engaging the angular surface at the outer end of each gaging means, and indicator mounting means carried by the frame and positioned so that the contactor of the indicator will engage the operating means.

2. An internal dimensional gage as in claim 1 in which the angles of the angular surfaces are approximately 26 degrees, 34 minutes.

3. An internal dimensional gage as in claim 1 in which the spring means engages the operating member to propel the latter in an axial direction to move the gaging means radially outwardly.

4. An internal dimensional gage as in claim 3 in which the operating member has a diametrical slot extending therethrough, a pin carried by the frame and extending through the slot, and the spring means having ends one of which engages the pin and the other end engages the operating member.

5. An internal dimensional gage as in claim 1 in which the angular surface at the outer end of each gaging means is a flat surface, and the axial limiting means has a cylindrical periphery engaging the angular surfaces.

6. An internal gage as in claim 1 in which each gaging means includes a slide received in the radial guides and a gaging element secured to the slide, and abutting means carried by a slide to engage the other slide and limit contractile movement of the slides.

7. An internal gage as in claim 6 in which the abutting means is a V-shaped member having legs which straddle the slide.

No references cited.

SAMUEL S. MATTHEWS, *Primary Examiner.*